United States Patent
Lorenz et al.

(10) Patent No.: US 9,677,483 B2
(45) Date of Patent: Jun. 13, 2017

(54) METHOD FOR IDENTIFYING FUEL MIXTURES

(71) Applicant: Robert Bosch GmbH, Stuttgart (DE)

(72) Inventors: Marko Lorenz, Grossbottwar (DE); Andreas Posselt, Muehlacker (DE); Andrea Krusch, Ludwigsburg (DE); Andreas Gutscher, Markgroeningen (DE); Haris Hamedovic, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/783,804

(22) PCT Filed: Feb. 12, 2014

(86) PCT No.: PCT/EP2014/052707
§ 371 (c)(1),
(2) Date: Oct. 9, 2015

(87) PCT Pub. No.: WO2014/166653
PCT Pub. Date: Oct. 16, 2014

(65) Prior Publication Data
US 2016/0069284 A1    Mar. 10, 2016

(30) Foreign Application Priority Data
Apr. 12, 2013    (DE) .................. 10 2013 206 552

(51) Int. Cl.
*F02D 41/00*    (2006.01)
*F02D 19/08*    (2006.01)
(Continued)

(52) U.S. Cl.
CPC ..... *F02D 41/0025* (2013.01); *F02D 19/0623* (2013.01); *F02D 19/0634* (2013.01);
(Continued)

(58) Field of Classification Search
CPC .............. F02D 41/0025; F02D 41/047; F02D 41/3094; F02D 41/32; F02D 41/1456; F02D 19/0634; F02M 19/08
(Continued)

(56) References Cited

U.S. PATENT DOCUMENTS 6,997,172 B2 * 2/2006 Oshimi ............... F02D 41/0025
123/1 A
7,472,679 B2 * 1/2009 Yamashita .......... F02D 41/3094
123/302
(Continued)

FOREIGN PATENT DOCUMENTS

| EP | 2 060 761 | 5/2009 |
| JP | 2009180171 A | 8/2009 |
| WO | 2006027853 A1 | 3/2006 |

OTHER PUBLICATIONS

International Search Report for PCT/EP2014/052707, dated Jun. 23, 2014.

*Primary Examiner* — Mahmoud Gimie
(74) *Attorney, Agent, or Firm* — Norton Rose Fulbright US LLP; Gerard Messina

(57) ABSTRACT

In a method for identifying a fuel type or a fuel mixture for a combustion chamber of an internal combustion engine having (i) a first intake opening connected to a first intake manifold inside which a first fuel injector is located, and (ii) a second intake opening connected to a second intake manifold inside which a second fuel injector is located, in a first method step, the first fuel injector remains closed, and in a second method step the first fuel injector is opened again and a first test fuel quantity is injected into the combustion chamber in the second method step via the first intake opening, and a second test fuel quantity is injected via the
(Continued)

second intake opening, the first test fuel quantity and the second test fuel quantity being made up to form a predefined fuel quantity.

9 Claims, 3 Drawing Sheets

(51) Int. Cl.
*F02D 41/32* (2006.01)
*F02D 41/04* (2006.01)
*F02D 41/30* (2006.01)
*F02D 19/06* (2006.01)
*F02D 41/14* (2006.01)
*F02D 41/26* (2006.01)

(52) U.S. Cl.
CPC ....... *F02D 19/0692* (2013.01); *F02D 19/088* (2013.01); *F02D 41/047* (2013.01); *F02D 41/1456* (2013.01); *F02D 41/26* (2013.01); *F02D 41/3094* (2013.01); *F02D 41/32* (2013.01); *F02D 2200/0612* (2013.01); *Y02T 10/36* (2013.01)

(58) Field of Classification Search
USPC ......... 701/104, 114, 103; 123/308, 432, 575
See application file for complete search history.

(56) References Cited

U.S. PATENT DOCUMENTS

| | | | | |
|---|---|---|---|---|
| 7,584,744 | B2 * | 9/2009 | Pagot | F02B 25/22 |
| | | | | 123/432 |
| 7,885,752 | B2 * | 2/2011 | Kawamura | F02D 19/0631 |
| | | | | 123/362 |
| 8,893,665 | B2 * | 11/2014 | Surnilla | F02D 41/04 |
| | | | | 123/1 A |
| 2004/0182378 | A1 * | 9/2004 | Oshimi | F02D 41/0025 |
| | | | | 123/685 |
| 2009/0112442 | A1 * | 4/2009 | Tsunooka | F02D 19/088 |
| | | | | 701/103 |
| 2009/0248279 | A1 * | 10/2009 | Ito | F02D 41/0025 |
| | | | | 701/109 |
| 2013/0312690 | A1 * | 11/2013 | Ferrie | F02D 19/0684 |
| | | | | 123/1 A |

* cited by examiner

METHOD FOR IDENTIFYING FUEL MIXTURES

BACKGROUND OF THE INVENTION

1. Field of the Invention

The present invention relates to a method for identifying a fuel type or a fuel mixture in an internal combustion engine.

2. Description of the Related Art

Such internal combustion engines are generally known and operated by supplying an air-fuel mixture to the combustion chamber during the intake stroke. To generate the air-fuel mixture, fuel injectors inject and atomize a predefined fuel quantity into an intake manifold which is connected to the combustion chamber via an intake port. A throttle valve disposed in the intake manifold defines the amount of fresh air that is aspirated in the direction of the combustion chamber. The opening of the throttle valve causes an increase in pressure in the intake manifold, which reduces the evaporation tendency of the injected fuel. Together with fuel, which, for example, is sprayed against the intake manifold wall by the fuel injector, fuel is also deposited on the wall of the intake manifold when the throttle valve is opened, due to the reduced evaporation tendency. When the throttle valve is closed, the pressure in the intake manifold is reduced, the evaporation tendency rises, and fuel deposited on the wall evaporates into the intake manifold, which causes an enrichment of the fuel-air mixture. In both cases the fuel quantity supplied to the combustion chamber, i.e., the actual fuel quantity, differs from the intended fuel quantity, i.e., the setpoint fuel quantity.

For this reason it is generally known to adapt the provided fuel quantity that is injected into the intake manifold in such a way that losses or additional quantities of fuel which, for instance, result from the collection or deposition of fuel on the wall are compensated. If such an adaption is not made or is made incorrectly, there is the risk that the fuel-air mixture in the combustion chamber becomes lean or enriched. Power losses or even combustion misses may then occur under these circumstances. On the other hand, if the lost or additional quantities of fuel are taken into account in a fuel injection and if the injected fuel quantity is adapted, it is possible to ensure a steady operation of the internal combustion engine that produces low emissions.

In addition, internal combustion engines are known which are operated using a fuel mixture that includes multiple fuel types or that can be operated using one of several possible fuel type(s). More specifically, internal combustion engines are known for which a fuel mixture that is composed of a different mixture ratio of gasoline and alcohols is provided, especially ethanol and methanol. These internal combustion engines are known as flex-fuel combustion engines, among other designations, and in particular make it possible to utilize gasoline as fuel in the event that the preferred operation of the internal combustion engine on the basis of alcohols is impossible. Such a situation arises, for instance, when the availability of alcohols is restricted in terms of time or locality. However, the operability on the basis of different fuel mixtures also requires that the composition of the air-fuel mixture and the ignition firing point be adapted to the used fuel mixture (especially to its composition), in particular in cases where the composition of the fuel mixture varies. This requires an identification of the fuel mixture or the fuel type. In the related art, the alcohol content is ascertained with the aid of an alcohol sensor. This has the disadvantage that the ascertainment of the fuel composition entails additional expense because an additional detection means, such as an ethanol sensor, must be installed.

BRIEF SUMMARY OF THE INVENTION

In contrast to the related art, the method of the present invention for identifying a fuel type or a fuel mixture composed of multiple fuel types for an internal combustion engine has the advantage that inferences with regard to the fuel mixture or the fuel type are able to be made in a cost-effective manner and without any particular additional effort.

According to the present invention, in a first method step it is prevented that fuel is injected into one of the intake manifolds (i.e., the first intake manifold) leading to the combustion chamber, the fuel being composed either of one of a multiplicity of possible (i.e., provided for the internal combustion engine) fuel types or of a mixture of these fuel types. During the first method step, a substitute fuel quantity which corresponds to the fuel quantity that is injected into both or into all intake manifolds in a normal operation is simultaneously supplied to the combustion chamber via the second intake manifold or via multiple other intake manifolds.

The fuel that has accumulated on the wall of the first intake manifold evaporates during the first method step and enriches the air-fuel mixture that is conveyed into the combustion chamber, the degree of the enrichment being a function of the fuel mixture or the fuel type utilized.

The enrichment in the air-fuel mixture that occurs during the first method step is able to be determined on the basis of the change in a lambda value, i.e., based on a lambda-value variation. A lambda probe, which preferably is situated at the outlet of the combustion chamber or the multiplicity of combustion chambers provided in the internal combustion chamber or in the exhaust tract, then ascertains the lambda value that quantifies the residual oxygen content in the exhaust gas emerging from the combustion chamber. In particular a rich excursion, i.e., a decrease in the lambda value, can be observed during the first method step.

In a second method step, the first test fuel quantity is injected into the first intake manifold via the first fuel injector, and the second test fuel quantity is injected into the second intake manifold via the second fuel injector. The sum of the first and second fuel quantity corresponds to the predefined fuel quantity in a standard operation or to the substitute fuel quantity. This has the result that fuel is deposited on the wall in the first intake manifold and the air-fuel mixture supplied to the combustion chamber becomes leaner, the measure of the enleanment being a function of the fuel mixture or the fuel type used. The change in the lambda value assumes the form of an enleanment excursion during the second method step, that is to say, the lambda value rises.

The magnitude and duration of the enrichment and/or enleanment excursion are a measure of the quantitative difference between the actual and the setpoint fuel quantity in the combustion chamber and depend on the fuel mixture or the fuel type that is used for operating the internal combustion engine. In the present invention, this makes it possible to utilize the magnitude and/or the duration of the enrichment and/or enleanment excursion for identifying the fuel type or the fuel mixture. In particular it is provided to detect fuel mixtures that are composed of the same fuel types at different mixture ratios with the aid of the method of the present invention. It is especially advantageous that the lambda probe already installed on the internal combustion engine is used for identifying the fuel type or the fuel mixture, so that an additional detection means, such as an ethanol sensor, which causes additional expense, is able to be dispensed with. On the other hand, if the internal combustion engine is equipped with an additional ethanol sensor nevertheless, then the identification according to the method of the present invention may advantageously be utilized for controlling and diagnosing the ethanol sensor or as a replacement of a defective ethanol sensor (e.g., in the event of its malfunction).

In one preferred specific embodiment of the present invention, the first and the second fuel quantity, and/or in the second method step, the first and the second test fuel quantity are/is injected into the intake manifold in equal amounts under standard conditions. It is advantageous that the fuel injectors may have the same design, which avoids additional expense that is incurred by the production of a further type of fuel injectors.

In one further preferred specific embodiment of the present invention, the change in the lambda value is ascertained in the course of the first method step and/or in the course of the second method step. If the change in the lambda value is recorded only in the course of the first or only in the course of the second method step, it is advantageously possible to reduce the work and expense involved in analyzing the lambda probe. If the change in the lambda value is determined both in the course of the first and in the course of the second method step, the measuring accuracy is able to be increased. In the same way it is possible to analyze only the magnitude of the lambda excursion (keeping the work to a minimum) or the temporal lambda characteristic (optimized with regard to accuracy).

In one especially preferred specific embodiment of the present invention, the fuel type or the fuel mixture, in particular its composition, is identified on the basis of the change in the lambda value, and in a third method step, the injected fuel quantity is adapted to the used fuel type or the fuel mixture for the standard operation on the basis of the obtained information, for instance by modifying the injection duration. This advantageously results in an operation of the internal combustion engine that produces lower emissions and is more optimal in terms of the output, since no unnecessary fuel quantity or no insufficient fuel quantity is injected into the combustion chamber (especially in comparison with a case where no adaptation to the particular fuel type or the particular fuel mixture is taking place).

The identification of the fuel type or the fuel mixture may also be used for adapting the ignition firing point in the combustion chamber in a normal operation, the optimal instant for an operation of the internal combustion engine in terms of low emissions and an optimized output being a function of the fuel mixture or the fuel type. The method of the present invention provides the advantage that once the fuel type or the fuel mixture has been identified, the ignition firing point is adapted to the fuel type or to the fuel mixture used, which results in a low-emissions and output-optimized operation of the internal combustion engine. For the stated reasons (i.e., to enable a low-emissions and output-optimized operation), it is advantageous in one especially preferred variant of the method of the present invention if both the injected fuel quantity and the ignition firing point are adapted to the identified fuel type or to the identified fuel mixture.

In one preferred specific embodiment, the internal combustion engine is a flex-fuel internal combustion engine, and the identification of the fuel mixture is used for adapting the mixture formation, i.e., the composition of oxygen and fuel quantity provided for the combustion chamber, and for adapting the ignition firing point of the air-fuel mixture for an operation that produces the lowest emissions possible and is optimized in terms of consumption. An alcohol sensor, especially an ethanol sensor, which is normally provided for the operation of a flex-fuel internal combustion engine and therefore causes extra expense in the production of the internal combustion engine, is advantageously dispensed with.

In one preferred specific embodiment of the present invention, the method for identifying the fuel type or the fuel mixture is implemented after the fuel type or the fuel mixture has been changed. This is advantageous insofar as the fuel type or the fuel mixture for operating the internal combustion engine can be varied without running the risk that the fuel quantity intended for the injection is not adapted to the new fuel type or to the new fuel mixture. Instead, the new fuel type or the new fuel mixture is identified and the parameters, i.e., the injected fuel quantity and/or the ignition firing point, are then adapted in order to thereby advantageously ensure the low-emission and output-optimized operation of the internal combustion engine, even if the fuel types or the fuel mixtures have been changed or a change of the fuel type to a fuel mixture or vice versa has taken place.

In one further preferred specific embodiment, the fuel type or the fuel mixture introduced for operating the internal combustion engine is unknown. In this case, the present invention provides that the change in the lambda value then measured be allocated to the fuel type or the fuel mixture. In particular it is provided to store the newly obtained information (i.e., that the measured change in the lambda value is associated with the unknown fuel), and to utilize it in the next method according to the present invention for identifying the fuel type or the fuel mixture. This has the advantageous result that the number of usable fuel types or fuel mixtures that can be adapted for the fuel injection and the ignition firing point can be increased over the lifetime of the internal combustion engine.

In one further specific embodiment, the fuel quantity or the fuel mixture is known, and a change in the lambda value, for instance during a normal operation of the internal combustion engine, is noticed despite the adaptation of the injected fuel quantity. Such a situation occurs when impurities collect at the intake manifold, for example. If this situation arises, an excessive or insufficient fuel quantity is injected into the combustion chamber despite the adaptation of the injected fuel quantity to the fuel type or the fuel mixture. In one variant of an embodiment of the present invention, the fuel quantity to be injected is readapted to the particular fuel mixture or to the particular fuel type under these circumstances. The advantage of this variant of an embodiment of the present invention is that the output-optimized or low-emissions operation of the internal combustion engine can be ensured across the service life of the internal combustion engine.

In one further preferred specific embodiment of the present invention, the injection of the fuel is controlled by computer.

Exemplary embodiments of the present invention are illustrated in the drawing and explained in greater detail in the following description.

DETAILED DESCRIPTION OF THE INVENTION

Figure 1:
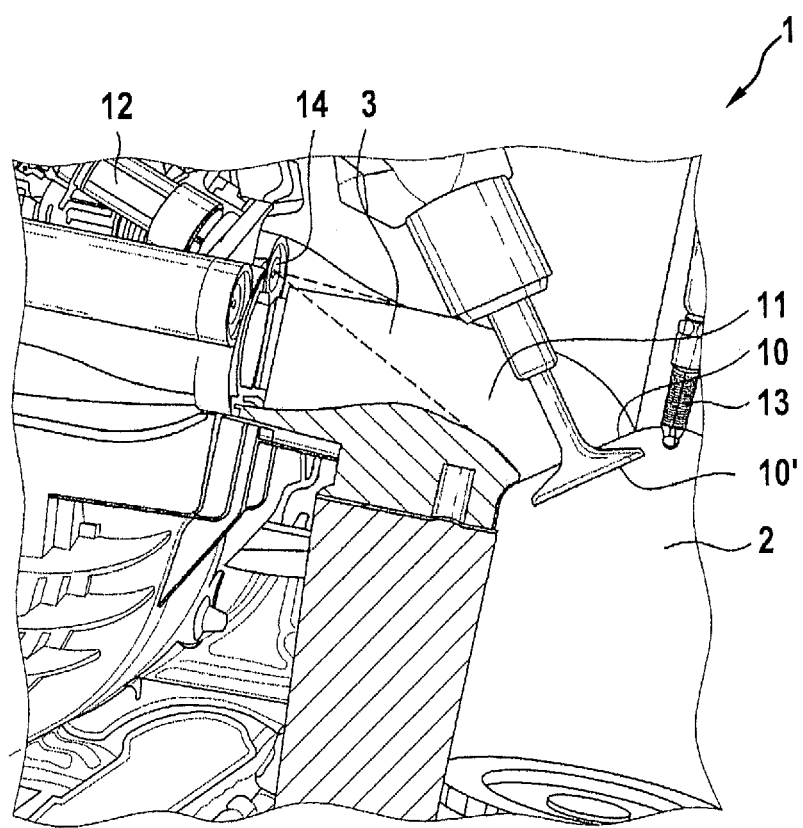
FIG. 1 shows a portion of an internal combustion engine.

FIG. 1 shows a portion of an internal combustion engine 1, which includes a combustion chamber 2, a fuel injector 12, an intake valve 10', an ignition means 13, an injection orifice 14, an intake opening 10, and a first intake manifold 11, while fuel 3 is injected into first intake manifold 11 in the direction of the combustion chamber; a second intake manifold is provided as well (not shown in FIG. 1). The used fuel, for example, may be one of a plurality of possible fuel types or a fuel mixture that is composed of multiple fuel types that can be used for operating the internal combustion engine. The fuel is atomized in the form of spray cones during the injection, which is illustrated by dashed lines in FIG. 1.

Figure 2A:
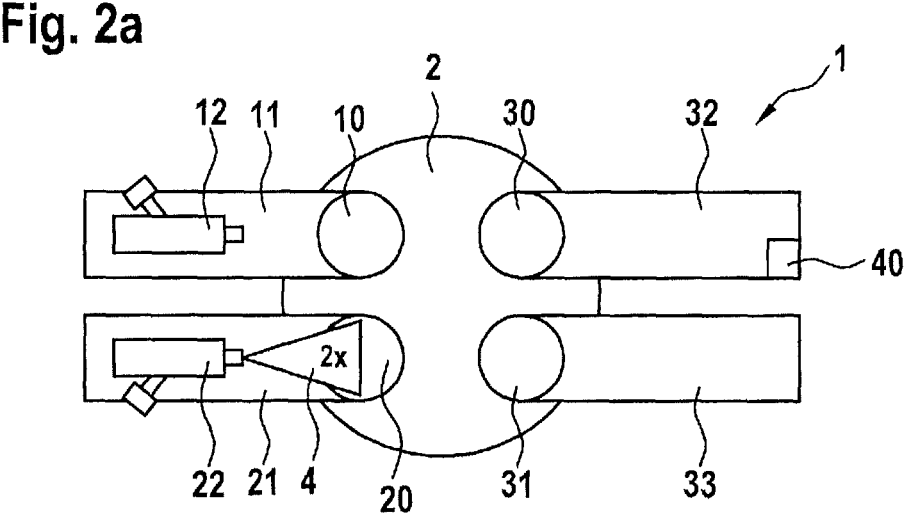
FIG. 2a schematically illustrates a portion of the internal combustion engine which executes a first method step of a method according to an exemplary embodiment of the present invention.
Figure 2B:
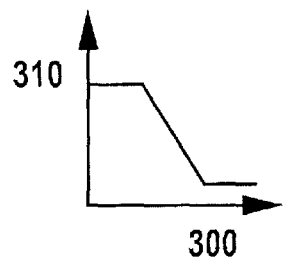
FIGS. 2b and 2c illustrate the temporal change of an accumulated fuel quantity.

FIGS. 2a and 2b are schematic illustrations of a portion of internal combustion engine 1 carrying out a first method step of a method according to an exemplary embodiment of the present invention. The internal combustion engine is provided with combustion chamber 2, a first and second intake manifold 11 and 21, and at least one fuel injector per intake manifold, i.e., at least two fuel injectors 12, 22. Combustion chamber 2 is developed in such a way that a piston (not shown in the FIG.) is able to move inside it, and the wall of the combustion chamber has two intake openings 10, 20 through which an air-fuel mixture is aspirated, and two discharge openings 30, 31 from which the raw emissions are expelled from combustion chamber 2 into outlet ducts 32, 33 following the combustion process of the air-fuel mixture. A lambda sensor, which is able to ascertain the residual oxygen content of the exhaust gas, is usually located at the outlet of combustion chamber 2. During a normal operation, both fuel injectors 12, 22 inject a predefined fuel quantity in the direction of the individual intake openings 10, 20 into intake manifolds 11, 12, so that an air-fuel mixture is formed in the individual intake manifold together with the aspirated air. The quantity of the aspirated air is varied with the aid of a throttle valve. When internal combustion engine 1 is to supply an increased torque, for example, the throttle valve opens. In this case the pressure in intake manifold 11, 21 increases, the evaporation tendency of the fuel drops, and a portion of the fuel deposits on the wall, the deposited fuel quantity being a function of the fuel type and the fuel mixture. Together with the fuel that is sprayed on the wall during the injection process, the fuel deposited on the wall is missing from the air-fuel mixture when it is conveyed to combustion chamber 2. When the throttle valve is closed, the intake manifold pressure drops, the evaporation tendency of the fuel increases, the fuel deposited on the wall of the intake manifold evaporates into the volume of the intake manifold and is ultimately supplied to combustion chamber 2 in addition, the evaporated fuel quantity being a function of the fuel type or the fuel quantity.

Figure 2C:
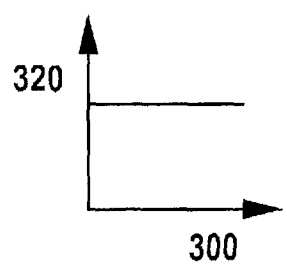

FIG. 2a illustrates a first method step, in which a first fuel injector 12 is closed across at least one full cycle, so that no fuel is injected into first intake manifold 11 and the wall film on its wall shrinks. At the same time, second fuel injector 22 injects a substitute fuel quantity 4 into second intake manifold 21, whose quantity corresponds precisely to the fuel quantity that would be jointly injected from both fuel injectors (illustrated in the FIG. by the bold "2x") during a normal operation. FIG. 2b illustrates that the fuel accumulation on the wall of first intake manifold 310 decreases over time 300 during the first method step. In contrast, the fuel deposits on the wall of second intake manifold 320 remain constant in relation to time 300, as illustrated in FIG. 2c.

Figure 2D:
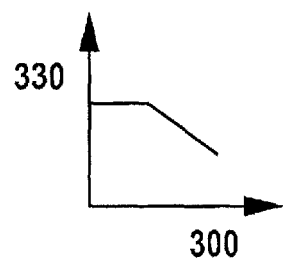
FIG. 2d illustrates the temporal change of a lambda value.

Using the lambda probe, it is determined that measured lambda value 330 decreases over time 300 while the wall film shrinks. The change in the lambda value is referred to as enrichment excursion and is shown in FIG. 2d.

Figure 3A:
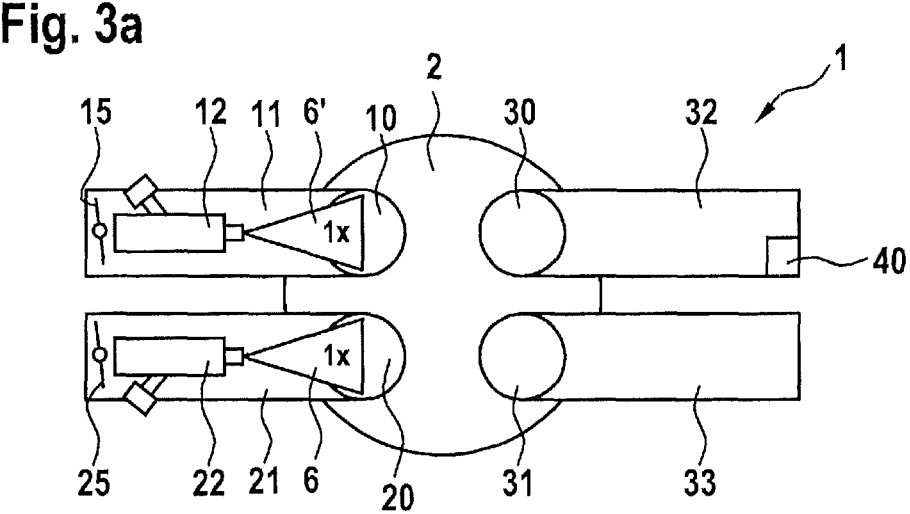
FIG. 3a schematically illustrates a portion of the internal combustion engine which executes a second method step of a method according to an exemplary embodiment of the present invention.

FIG. 3a schematically illustrates the second method step of the method according to an exemplary specific embodiment of the present invention.

Figure 3B:
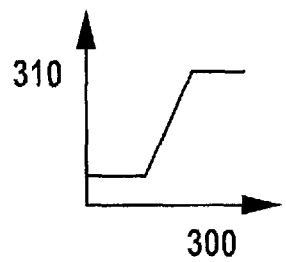
FIGS. 3b and 3c illustrate the temporal change of an accumulated fuel quantity.
Figure 3C:
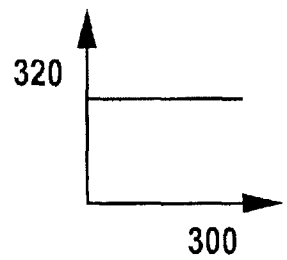
Figure 3D:
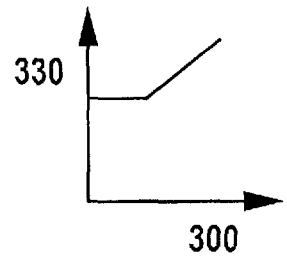
FIG. 3d illustrates the temporal change of a lambda value.

In the second method step, first fuel injector 12 is opened again and a first test fuel quantity 6 is injected into first intake manifold 11. First test fuel quantity 6 together with a second test fuel quantity 6', which is injected by second fuel injector 22 into second intake manifold 21, jointly form a fuel quantity that corresponds to the predefined fuel quantity from the normal operation or to the substitute fuel quantity. During the second method step, fuel once again accumulates on the wall in first intake manifold 11, i.e., the fuel deposits on the wall of first intake manifold 310 increase over time 300. This is illustrated in FIG. 3b. FIG. 3c shows that the fuel deposits on the wall of second intake manifold 320 remain constant. It is also determined during the second method step that lambda value 330 increases over time 300. This increase in the lambda value is referred to as enleanment excursion and is shown in FIG. 3d.

Both the duration and the magnitude of the enrichment excursion that is ascertained from the first method step illustrated in FIG. 2, and the magnitude and duration of the lean excursion, which is ascertained from the second method step shown in FIG. 3, are a function of the fuel type or the fuel mixture used by the internal combustion engine. In the present invention, this dependency is used for identifying the fuel type or the fuel mixture.

What is claimed is:

1. A method for identifying one of a fuel type or a fuel mixture made up of a plurality of fuel types, on the basis of a change in a lambda value for an operation of an internal combustion engine having a combustion chamber, the internal combustion engine being operable using different types of fuel or fuel mixtures, the combustion chamber having (i) a first intake opening connected to a first intake manifold inside which a first fuel injector is situated, and (ii) a second intake opening connected to a second intake manifold inside which a second fuel injector is situated, wherein a predefined fuel quantity is injected during a normal operation, the predefined fuel quantity being made up of a first fuel quantity to be injected by the first fuel injector and a second fuel quantity to be injected by the second fuel injector, the method comprising:

in a first method step, maintaining the first fuel injector closed; and in a second method step, (i) opening the first fuel injector and (ii) injecting a first test fuel quantity via the first fuel injector and injecting a second test fuel quantity via the second fuel injector, the first test fuel quantity and the second test fuel quantity forming the predefined fuel quantity, wherein at least one of:
- at least one of a magnitude or a duration of an enrichment excursion of the lambda value during the first method step is utilized for identifying the fuel type or the fuel mixture; or
- at least one of a magnitude or a duration of an enleanment excursion of the lambda value in the second method step is utilized for identifying the fuel type or the fuel mixture.

2. The method as recited in claim 1, wherein at least one of:
(i) during a normal operation, the first fuel quantity injected by the first fuel injector and the second fuel quantity injected by the second fuel injector are identical; and
(ii) in the second method step, the first test fuel quantity injected by the first fuel injector and the second test fuel quantity injected by the second fuel injector are identical.

3. The method as recited in claim 1, wherein at least one of (i) a change in a lambda value at least one of at the start of and during the course of the first method step is monitored, and (ii) a change in a lambda value at least one of at the start of and during the course of the second method step is monitored.

4. The method as recited in claim 1, further comprising:
after the one of the fuel mixture or the fuel type is identified, performing in a third method step at least one of (i) performing a normal operation using a fuel quantity adapted to the one of the fuel mixture or the fuel type, and (ii) adapting the ignition firing point during a normal operation to the one of the fuel mixture or the fuel type.

5. The method as recited in claim 4, wherein the internal combustion engine is a flex-fuel internal combustion engine.

6. The method as recited in claim 1, wherein the one of the fuel mixture or the fuel type is identified after the one of the fuel mixture or the fuel type was changed for the operation of the internal combustion engine.

7. The method as recited in claim 3, wherein the one of the fuel mixture or the fuel type used for operating the internal combustion engine is not known, and the measured change in the lambda value is allocated to the one of the fuel mixture or the fuel type.

8. The method as recited in claim 3, wherein the one of the fuel mixture or the fuel type used for operating the internal combustion engine is known, and a change in the lambda value arising during a normal operation triggers a renewed adaptation of the fuel quantity as soon as a change in the emission characteristics of the internal combustion engine exceeding a predefined value is ascertained.

9. A non-transitory, computer-readable data storage medium storing a computer program having program codes which, when executed on a computer, perform a method for identifying one of a fuel type or a fuel mixture made up of a plurality of fuel types, on the basis of a change in a lambda value for an operation of an internal combustion engine having a combustion chamber, the internal combustion engine being operable using different types of fuel or fuel mixtures, the combustion chamber having (i) a first intake opening connected to a first intake manifold inside which a first fuel injector is situated, and (ii) a second intake opening connected to a second intake manifold inside which a second fuel injector is situated, wherein a predefined fuel quantity is injected during a normal operation, the predefined fuel quantity being made up of a first fuel quantity to be injected by the first fuel injector and a second fuel quantity to be injected by the second fuel injector, the method comprising:
- in a first method step, maintaining the first fuel injector closed; and
- in a second method step, (i) opening the first fuel injector and (ii) injecting a first test fuel quantity via the first fuel injector and injecting a second test fuel quantity via the second fuel injector, the first test fuel quantity and the second test fuel quantity forming the predefined fuel quantity.

* * * * *